J. Colton.

Safety Pocket.

No. 3,729. Reissued Nov. 16, 1869.

Witnesses;

Alex Mahon

Edw F Brown

Inventor;

Jos. Colton

3

N. PETERS, PHOTO-LITHOGRAPHER, WASHINGTON, D. C.

United States Patent Office.

JOSEPH COLTON, OF NEW YORK, N. Y.

*Letters Patent No.* 71,706, *dated December* 3, 1867; *reissue No.* 3,729, *dated November* 16, 1869.

IMPROVEMENT IN SAFETY-POCKETS.

The Schedule referred to in these Letters Patent and making part of the same.

*To all whom it may concern:*

Be it known that I, JOSEPH COLTON, (formerly of New Orleans, in the parish of Orleans, and State of Louisiana, but now) of the city, county, and State of New York, have invented a new and useful Improvement in Safety-Pockets and Clasps, of which the following is a full, clear, and exact description, reference being had to the accompanying drawings, forming part of this specification, in which—

Similar letters of reference indicate like parts in all the figures.

The invention relates to a new and useful device for protecting money, watches, and other articles of value, from the depredations of pickpockets, and consists in a novel construction of clasp, forming the mouth of the pocket, as hereinafter described.

Figure 3:
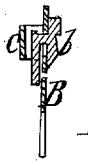
Figure 3 is a section of fig. 2, through the line *x x*.
Figure 4:
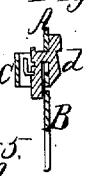
Figure 4 is a section of the same, through the line *y y*.
Figure 5:
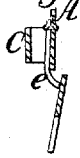
Figure 5 is a section of the same, through *z z*.

The clasp or mouth of the pocket is composed of two semicircular plates, A and B, arranged, the one within the other, and hinged together at their ends, in such manner, that when the clasp or pocket is closed, the faces of the two plates are "flush," or in the same plane with each other, as shown in figs. 3 and 4.

The plate A has attached to its inner face a spur or arm, *a*, against which plate B strikes, when the clasp is shut, and which serves as a stop to prevent plate B from passing in beyond plate A.

Figure 1:
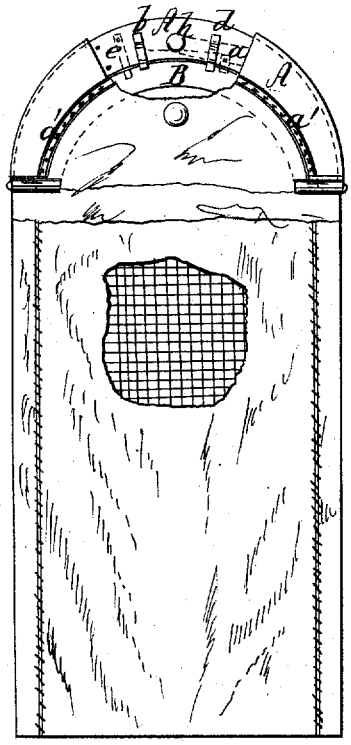
Figure 1 represents a longitudinal view of the pocket, with the clasp attached, the outside of the pocket being broken away to show the wire protection.

*b* and *d* are spring-slide catches, which work in slots in plate A, and the outer arms of which project beyond the inner edge of said plate, and over plate B, as shown in fig. 1, and serve to hold the latter in its closed position.

An inner extended arm of said slides or catches (either or both) serves as an additional stop to plate B, to prevent its passing inward beyond plate A.

*f* is a spring, rigidly connected to plate A, and which engages with or acts upon slides *b d*, and serves to hold them down with a constant pressure.

*g* is a second spring, connected at one end with plate A, and, at its other, with a stud or pin, *h*, which passes through plate A.

The spring *g* is provided with a spur, as shown in fig. 4, which, when not forced out by pressure on the pin *h*, enters one or the other of two notches in the slide *d*, and serves to lock the latter, to permit or to prevent the opening of the clasp, as desired.

The outer face of plate B, or the face thereof adjacent to plate A, is cut away, from a point at or near the hinges to a point near the centrally-arranged locking-devices, above described, in such manner as to form elongated curved slots *a′ a′*, or openings between the two plates A and B, of sufficient width to allow the material of which the pocket or garment is made to be bound around the two parts of the clasp, for covering their edges, and concealing them from sight, without interfering with their action, or that of the locking-devices.

Figure 2:
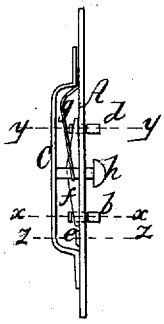
Figure 2 is a top view, showing the manner in which the clasp is constructed.

C is an angular shield, shown in top view, fig. 2, attached to the back of the plate A, and covering the inner legs or arms of the slide-catch or catches, and also springs *f g*, for preventing the action of the latter from being interfered with by the cloth or material composing the pocket or garment.

A bent spring, *e*, is attached to plate A, and has one end projecting, so as to rest on plate B, when the clasp is closed, said spring serving to open the clasp, or to force plate B outward, when the latter is released from the retaining-slides or catches.

To prevent the pocket from being cut open, and the contents abstracted in that way, I insert an inner lining of wire, wire cloth, or wire gauze, between the outer sides of the pocket and the linings thereof.

From the foregoing description, it will be seen, that to get at the contents of the pocket, it is necessary, first, to press the pin *h* and spring *g*, connected therewith, inward, in order to release the slide *d*. Said slide is then withdrawn, or forced upward, until the plate B is released, when, by withdrawing the pressure from pin *h*, the spur on spring *g* enters the lower notch in the slide, and serves to hold it until it is again released by pressure on pin *h*, when spring *f*, acting on the slide *d*, forces it downward into position to lock the clasp.

The slide-catch *b* has no locking-device, and is simply withdrawn by the thumb or finger, and, when released, is thrown back by spring *f*.

What is claimed as new, and sought to be secured by Letters Patent, is—

1. The open shield C, in combination with the clasp and fastening-devices, as described.
2. The clasp-plates A B, constructed as described, with the slot or openings *a′* between their adjacent edges, substantially as described.
3. The combination of the plates A B, shield C, and spring-slide *b* or *d*, (either or both,) with the pocket, substantially as and for the purpose set forth.
4. The combination of plates A B, shield C, stop *a*, spring-slides *b d*, springs *e f g*, and pin *h*, all arranged and operating substantially as described.

JOS. COLTON.

Witnesses:

ALEX. MAHON,
EDM. F. BROWN.